US012743834B2

(12) United States Patent
Bharkhada et al.

(10) Patent No.: US 12,743,834 B2
(45) Date of Patent: Sep. 22, 2026

(54) RECONSTRUCTION OF PROMPT GAMMA COINCIDENCE DATA IN PET SCANS

(71) Applicant: Siemens Medical Solutions USA, Inc., Malvern, PA (US)

(72) Inventors: Deepak Bharkhada, Knoxville, TN (US); Vladimir Panin, Knoxville, TN (US); William Steinberger, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 211 days.

(21) Appl. No.: 18/624,710

(22) Filed: Apr. 2, 2024

(65) Prior Publication Data

US 2025/0308099 A1 Oct. 2, 2025

(51) Int. Cl.
*G06T 12/20* (2026.01)
*G06T 12/10* (2026.01)

(52) U.S. Cl.
CPC .............. *G06T 12/20* (2026.01); *G06T 12/10* (2026.01); *G06T 2211/452* (2023.08)

(58) Field of Classification Search
None
See application file for complete search history.

(56) References Cited

U.S. PATENT DOCUMENTS 7,381,959 B2 * 6/2008 Manjeshwar ......... G01T 1/2985 250/363.03

FOREIGN PATENT DOCUMENTS

| | | |
|---|---|---|
| EP | 2741109 B1 | 1/2018 |
| WO | 2015/006123 A1 | 1/2015 |
| WO | 2018/202878 A1 | 11/2018 |

OTHER PUBLICATIONS

Beekman et al, "Positron range-free and multi-isotope tomography of positron emitters", PMB, 2021, pp. 1-10 (Year: 2021).*
Binder et al, "Component characterization and commissioning of a gamma-PET prototype detector system", FP, 2022, pp. 1-11 (Year: 2022).*
Beekman, F J et al., "Positron range-free and multi-isotope tomography of positron emitters", Phys. Med. Biol., 66 (2021), Mar. 4, 2021, 065011, pp. 1-9.
Li, Chong et al., "Fast 3D kernel computation method for positron range correction in PET", Phys. Med. Bio. 68 (2023), Jan. 5, 2023, 025004, pp. 1-14.
Moskal, P et al., "Feasibility study of the positronium imaging with the J-PET tomograph", Phys. Med. Bio. 64 (2019), Mar. 7, 2019, 055017, pp. 1-14.
Martin, Charles C., et al., "Quantitative PET with Positron Emitters that Emit Prompt Gamma Rays", IEEE Transation on MEdical Imaging, vol. 14, No. 4, Dec. 1995, 7 pgs.

* cited by examiner

*Primary Examiner* — Edward Park

(57) ABSTRACT

A method of identifying prompt gamma rays by triple-photon detection is disclosed. The method involves using two annihilation photons and a prompt gamma photon to determine the direction of the corresponding prompt gamma ray.

2 Claims, 2 Drawing Sheets

RECONSTRUCTION OF PROMPT GAMMA COINCIDENCE DATA IN PET SCANS

FIELD

The present disclosure relates generally to the field of nuclear imaging systems and, more particularly, a novel method that accounts for prompt gamma associated events to increase sensitivity and reduce the effects of positron range.

BACKGROUND

One of the hurdles for obtaining high resolution positron emission tomography (PET) reconstruction image is positron range. In PET imaging, prompt gamma photons are approximately co-emitted with positrons by many PET isotopes are currently treated as uniform background noise and ignored. Prompt gamma correction during image reconstruction helps to get quantified images, but all of the events associated with the prompt gamma are lost.

Until now, it was not possible to distinguish prompt gamma photons from annihilation gamma photons. Even if the prompt gamma photons could be detected with energy qualification, in some cases, it is not possible to know the direction of the photon gamma ray corresponding to these prompt gamma photons. This direction is necessary for forward and back projection during reconstruction so that the prompt gamma ray associated events can be accounted for in reconstruction. Thus, it has not been possible to do prompt gamma reconstruction in PET scanners.

If the prompt gamma associated events could be accounted for in reconstruction, PET scan sensitivity can be improved and the image resolution can also be improved by reducing the effects of the positron range. Improved sensitivity is obtained by doing triple coincidence reconstruction simultaneously to obtain corresponding isotope image or by separately reconstructing prompt gamma photon to obtain isotope image and then combining with the isotope image we get from traditional reconstruction annihilation gammas. Some efforts using physical clustered collimators to identify direction of the prompt gamma rays have been recently published, however, such a method has to contend with the downsides of using physical collimators. Thus, there is a need for a better way of identifying prompt gamma photons along with corresponding ray directions and accounting for them in reconstruction to reduce effects of the positron range and improve PET image resolution.

SUMMARY

Some recent work has made it possible to approximately identify prompt gamma-ray direction. Prompt gamma photons can be identified directly with coincident annihilation photons through a combination of coincident timing and energy qualification. Generally, prompt gamma photons are emitted before the positron annihilates, which allows the events to be correlated in time.

Energy windows can also be adjusted to isolate prompt gamma photon interactions as prompt gamma photons have distinct energies in some cases. The inventors have devised a method that forward and back project the prompt gammas by forming a ray between the detector crystal where the prompt gamma is detected and the most likely annihilation position of coincidence photons. The reconstruction from detected prompt gamma photons will require two sequential kernels, one to account for positron range and another to account for time-of-flight (TOF) blurring. This is applied during forward and back projections but can be applied in the image domain. This will help improve sensitivity, data consistency, and can help improve resolution.

A novel method of utilizing prompt gamma photons in reconstructing a PET scan image from a PET scan list mode data that was acquired by scanning a subject body containing a quantity of radioisotope to reduce the effects of positron range and improve sensitivity is disclosed. Such method incorporates a novel method of identifying prompt gamma photons by triple-photon detection. The method of identifying prompt gamma photons involves using two annihilation photons and a prompt gamma photon to determine the direction of the corresponding prompt gamma ray. This allows prompt gamma associated events to be accounted for in reconstruction to improve PET scan sensitivity and image resolution. This method can be applied in PET, PET-CT, PET-MR, etc.

The present disclosure also provides an imaging system utilizing the methods disclosed herein.

BRIEF DESCRIPTION OF THE DRAWINGS

The features of the embodiments described herein will be more fully disclosed in the following detailed description, which is to be considered together with the accompanying drawings wherein like numbers refer to like parts.

DETAILED DESCRIPTION

Figure 1:
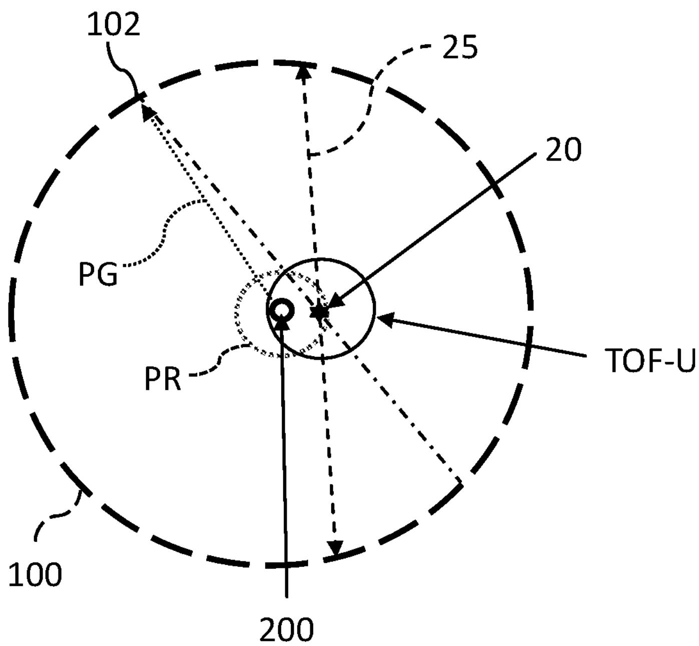
FIG. 1 is a schematic illustration of a PET detector ring annotated with the line-of-response (LOR) for annihilation gamma photons that originated from the most likely annihilation point, the radioisotope, the positron range for the radioisotope, and the time-of-flight uncertainty for the annihilation gamma photons.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Disclosed is a novel method of identifying prompt gamma rays by triple-photon detection. The method involves using two annihilation photons and a prompt gamma photon to determine the direction of the corresponding prompt gamma ray. Such information allows prompt gamma associated events to be accounted for in reconstruction to improve PET scan sensitivity and image resolution.

FIG. 1 is a schematic illustration of a PET detector ring 100. Each of the segments in the ring 100 represents a detector crystal. Line-of-response (LOR) 25 for annihilation gamma photons that originated from a most likely annihilation point 20 is shown. The source of the positron is the radioisotope 200. The positron range PR for the radioisotope 200 is noted. The time-of-flight uncertainty TOF-U for the annihilation gamma photons is also noted.

Coincident prompt photons can be reconstructed by forming an LOR between the detector crystal 102 where a prompt gamma PG is detected and the most likely annihilation point 20 of the LOR 25 for annihilation photons. Positron range and TOF-U are modeled. TOF kernel is usually obtained assuming a Gaussian distribution but other distributions could potentially be used. Positron range kernel can be obtained either by using Monte-Carlo simulation, which are more accurate but tend to be slower or numerical methods, which are usually faster but are less accurate.

For the method disclosed herein, each dimension of the positron range kernel should be at least as big as the positron range in the medium. The medium can be the soft tissue, bone, etc. inside a patient body, or a phantom material, depending on what is being scanned. Similarly, the TOF kernel value decreases as the distance from the annihilation point increases and its size can be limited to where the value becomes zero.

Kernel, as used herein refers to a cube of data (i.e., n*n*n dimension array) which can be as big as the image size but typically the values of voxels are zero after some distance from the voxel for which kernel is applied.

According to some embodiments of the present disclosure, a method of reconstructing a PET scan image from a PET scan list mode data is disclosed. The PET scan list mode data is acquired by scanning a subject body, such as a patient, containing a quantity of radioisotope. The method comprises: (A) accounting for prompt gamma photons emitted by the radioisotope, in addition to coincidence gamma photon pairs (also known as annihilation gamma photons), to improve sensitivity and (B) reconstructing the PET scan image from the list mode data, wherein the reconstruction accounts for the prompt gamma events by forward and back projecting along corresponding prompt gamma rays, along with positron range and TOF uncertainty modeling, thus improving the PET scan image's resolution by reducing effects of positron range.

List mode data means a stored file that contains the location, and energy of each detected photon.

In some embodiments, accounting for the prompt gamma photons comprises: identifying two coincidence annihilation gamma photons and the associated prompt gamma photon to determine the direction of the corresponding prompt gamma ray. In some embodiments, reconstruction of the prompt gamma events comprises:

1) identifying the prompt gamma photon using time correlation with coincidence annihilation gamma photons and/or using energy windowing;
2) using the TOF bin of the most-likely annihilation point 20 in the list mode data, of the coincidence annihilation gamma photons as a point needed to determine direction for forward projection and back projection along prompt gamma rays during reconstruction;
3) estimating a positron range kernel for the radioisotope used to generate the PET scan list mode data;
4) estimating TOF-U kernel using the PET scanner's TOF resolution, where the size of the TOF-U kernel is determined by TOF resolution of the PET scanner;
5) estimating the randoms rate and scatter rate for the prompt gamma photons, resulting in prompt gamma randoms rate and prompt gamma scatter rate;
6) creating a sensitivity image utilizing TOF-U and positron range kernel, normalization, and attenuation;
7) initializing a prompt gamma photon image to a value 1;
8) iterating the following steps a) through i) for a specified number of times or until converged, where the specified number is determined by the PET scanner system and the desired image quality:
   a) applying the positron range kernel to the prompt gamma photon image to obtain an updated image;
   b) applying the TOF uncertainty kernel to the updated image to obtain a further updated image;
   c) forward projecting along the further updated image for each prompt gamma photon event in the list mode data to generate forward projected prompt gamma data;
   d) adding the prompt gamma randoms rate and the prompt gamma scatter rate for corresponding prompt gamma rays in the forward projected data;
   e) back projecting reciprocal of the forward projected data corresponding to all prompt gamma events to obtain a back projected image;
   f) apply the positron range kernel to the back projected image data to obtain an updated back projected image;
   g) apply the TOF-U kernel to the updated back projected image to obtain a further updated back projected image;
   h) divide the further updated back projected image with the sensitivity image to obtain prompt gamma update image and then multiply this prompt gamma update image with current prompt gamma image to obtain an updated prompt gamma photon image; and
   i) outputting the updated prompt gamma photon image after a calibration for quantification. Usually, a calibration is necessary for quantification of radio-activity. Thus, in step i), the calibration is done with known radioactive source with an activity typically between 0.3 to 3 mCi for Siemens Healthineers scanners but can be done with other known activities. In some embodiments, other factors such as branching ratio can be included separately or with calibration factor as necessary.

Regarding the TOF bin of the most-likely annihilation point 20 referenced in the step 2) above, it is to be noted that for two photons forming annihilation gamma photons (an annihilation coincidence event), there is a TOF bin number and energy level information in the listmode data file for the two detector crystals in coincidence. Once the crystal numbers are identified, an LOR can be formed between the two detector crystals. Once the TOF bin number is identified, the corresponding location for the center of TOF bin on this LOR can be determined. This location can be called the most likely annihilation position. There are two crystals for annihilation photons and a third one for prompt gamma photons. The most likely annihilation point is the TOF bin number reported for the LOR formed between the two detector crystals corresponding to annihilation gammas. LOR for prompt gamma reconstruction is formed between the prompt gamma crystal and most likely annihilation point.

The disclosed method assumes list mode reconstruction. However, sinogram based reconstruction could also be performed. The disclose method assumes no point spread function modeling but that can also be included.

In step 1), the prompt gamma rays can be identified by a combination of energy qualification and time correlation. Prompt gamma photons are typically emitted within picoseconds of the emission of the positron, and are emitted with discrete energies. Energy bounds can be set to identify prompt gamma photons separately from annihilation gamma photons, and a detection time window can be set to ensure that the prompt gamma photon is in coincidence with the annihilation of a positron.

In step 3), the positron range kernel for the radioisotope under consideration can be estimated by computing the 3D positron annihilation probability in each voxel. One example of the algorithm that can be used to compute the 3D position annihilation probability is as disclosed in Li et al., *Fast 3D kernel computation method for positron range correction in PET*, Physics in Medicine and Biology, vol. 68 (2), 2023. A pseudo-code description of the algorithm as described by Li et al. is as follows:

| Algorithm: | Quasi-continuous energy loss (CEL) method | |
|---|---|---|
| Input | SP-positron stopping power in water | |
| | ES-energy spectra of positron emitters | |
| | $\mu_{Rj}$- relative attenuation coefficient of voxel j | |
| | $L_{ij}$-path segment length of path i in voxel j | |
| | $V_L$- volume of polyhedral layer associated with path segment $L_{ij}$ | |
| | $V_I$-intersection volume of $V_L$ with surrounding voxel | |
| Output: | A-positron annihilation probability in each voxel | |
| Initialize: | $E_{e+}$-position start energy | |
| | $A_{ij}$= 0-position annihilation probability in path segment length $L_{ij}$ | |
| Step 1 | | |
| | for $E_i$ < 5000 do | |
| | | $R \leftarrow \int_0^{E_{e+}} \frac{1}{f(E)\left(1.549 + 0.365e^{0.00151 \cdot E_{e+}} - 0.0000317E_{e+}\right)} dE$(range in water) |
| | end | |
| | return | $LUT_{water}$ (range look-up table in water) |
| Step 2 | | |
| | for each path | |
| | | $E_{e+}$ ← sample from ES in S keV energy step (enter the first voxel j = 1) |
| | | while $E_{e+}$ > 0 do |
| | | R ← $LUT_{water}$ [$E_{e+}$] - $\mu_j$ ×[] $L_{ij}$ (remaining energy) |
| | | $E_{e+'}$ ← $LUT_{water}$ [R] (remaining energy) |
| | | $E_{e+}$ ← $E_{e+'}$ (entering next voxel j') |
| | | end |
| | | $A_{ij}$ ++ |
| | | A ← Aij × ($V_I/V_L$) (probability contribution to surrounding voxels) |
| | end | |
| | return | A |

In step 4), the TOF resolution typically used is Gaussian but some other kernel could be used. Values for assumed distribution according to distance from the peak value which would be stored at the center of TOF-U kernel are stored at corresponding voxel locations.

In step 5), the prompt gamma photons that are detected with an unassociated pair of annihilation photons due to them being detected within the same time window are considered randoms. The prompt gamma randoms rate and scatter rate for prompt gamma photons are estimated by the following methods. Methods for annihilation photons scatter estimation like using a Monte-Carlo simulation can be implemented for prompt photons scatter estimation, and single scatter simulation can be adapted for prompt photons scatter estimation. Two popular methods used for measuring the randoms rate of annihilation photons include using a delayed window and using crystal singles to estimate smoothed randoms. These methods with some modifications could be used to estimate smoothed-randoms rates for triple-coincident events.

In step 6), sensitivity image is a concept well known in the image reconstruction art. Sensitivity image defines the probability of an event from a voxel being detected by a detector. In this case it will also include effects of attenuation, normalization, positron range, and TOF uncertainty.

In step 7), the prompt gamma photon image can be initialized to any non-zero value so forward projection is not zero but typically a value of 1 is used. The prompt gamma photon image can be initialized to any non-zero value so forward projection is not zero but typically a value of 1 is used. A non-zero value in forward projection is necessary for update in expectation likelihood based algorithms for non-zero regions. A value of zero will give an image of zero at all updates. In iterative reconstruction, one starts with an image and then at each iteration the image is updated into an updated image. This image after all the updates emerges as reconstructed prompt gamma image.

In step 8), determining the specified number for iterating the steps a) through i) involves looking at image quality features like resolution, contrast recovery, accuracy, and noise for different number of iterations and subsets and using the number that gives a desired image quality.

According to another aspect of the present disclosure, a method of reconstructing and identifying prompt gamma events by triple-photon detection using PET scan listmode data generated with a PET scanner is disclosed. The method can comprise the steps 1) through 8) discussed above.

Figure 2:
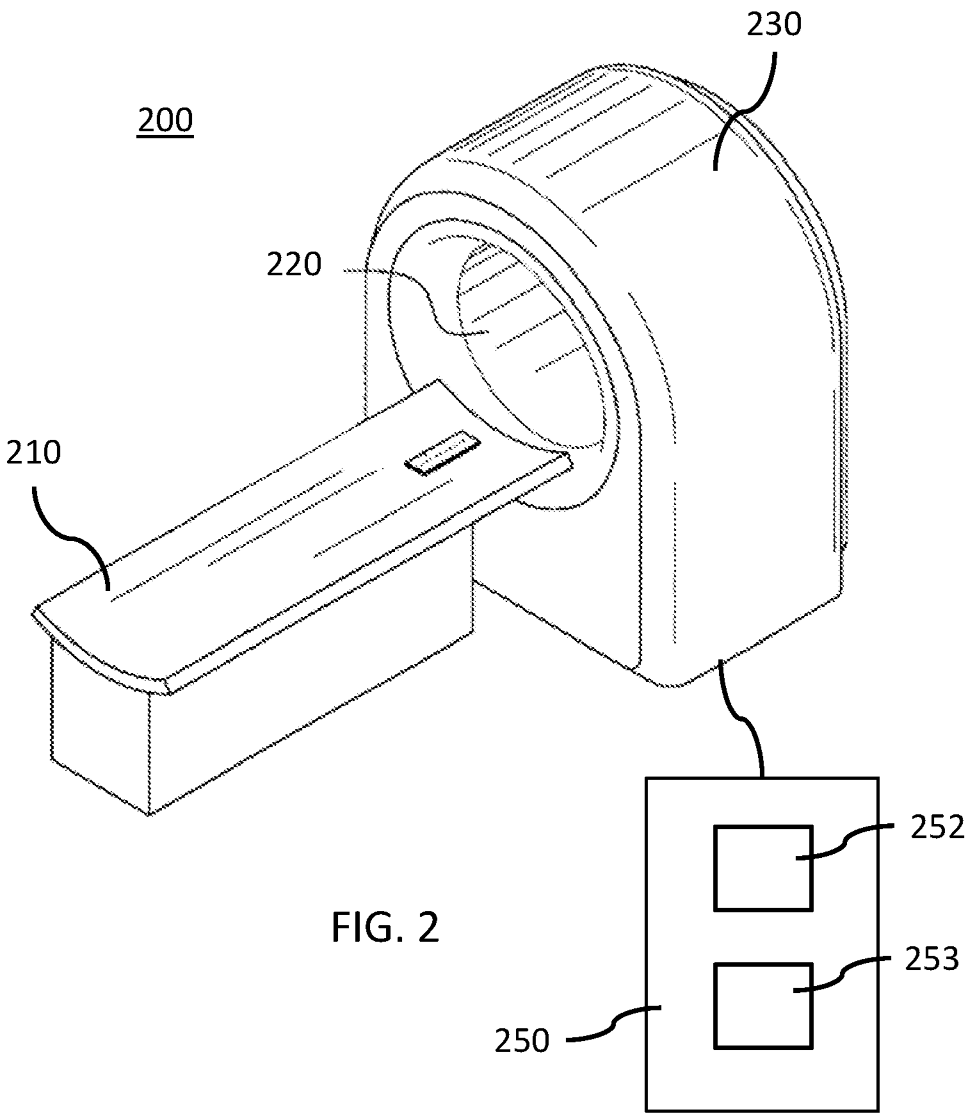
FIG. 2 is a schematic illustration of an imaging system that incorporates components configured to perform the disclosed novel method.

Referring to FIG. 2, the present disclosure also provides an imaging system 200 utilizing the method disclosed herein. Such imaging system 200 can comprise:

- a PET scanner 230 that scans and generates a PET scan list mode data;
- a memory unit 252, provided in a controller 250, having instructions stored thereon;
- a processor 253, provided in the controller 250, configured to read the instructions to perform a process of reconstructing a PET scan image from the PET scan list mode data that was acquired by scanning a subject body containing a quantity of radioisotope, wherein the method comprises:
  - (A) accounting for prompt gamma photons emitted by the radioisotope, in addition to coincidence annihilation gamma photon pairs to improve sensitivity and more accurately determine location of the radioisotope; and (B) reconstructing the PET scan image from the list mode data, wherein the reconstruction accounts for the prompt gamma photons associated events by forward and back projecting along the prompt gamma rays, along with positron range and TOF uncertainty modeling, thus improving the PET scan image's resolution by reducing effects of positron range.

In some embodiments of the imaging system, when the processor 253 performs the disclosed process, the process of accounting for the prompt gamma photons comprises: identifying the two coincidence annihilation gamma photons and associated prompt gamma photon to determine direction of the corresponding prompt gamma ray.

The steps 1) through 8) discussed above provides reconstruction of the prompt gamma events. Additionally, the steps 1) through 8) also help identify the associated prompt gamma photon to determine the direction of the prompt gamma ray.

The following is a list of non-limiting illustrative embodiments disclosed herein:

Illustrated Embodiment 1: A method of reconstructing a positron emission tomography (PET) scan image from a PET scan list mode data that was acquired by scanning a subject body containing a quantity of radioisotope, the method comprising:

accounting for prompt gamma photons emitted by the radioisotope, in addition to coincidence annihilation gamma photon pairs, to improve sensitivity and more accurately determine location of the radioisotope; and reconstructing the PET scan image from the list mode data, wherein the reconstruction accounts for the prompt gamma photon associated events by forward and back projecting along the prompt gamma rays, thus improving the PET scan image's resolution by reducing effects of positron range.

Illustrative Embodiment 2: The method of Illustrative Embodiment 1, wherein accounting for the prompt gamma rays comprises:

identifying the two coincidence annihilation gamma photons and associated prompt gamma events to determine direction of the corresponding prompt gamma ray.

Illustrative Embodiment 3: The method of Illustrative Embodiment 2, wherein identifying the associated prompt gamma events to determine the direction of the corresponding prompt gamma ray involves reconstruction of prompt gamma ray using a method that comprises:

1) identifying the prompt gamma ray using time correlation with coincidence annihilation gamma photons and/or using energy windowing;
2) using a most-likely annihilation point of time-of-flight (TOF) bin, in the list mode data, of the coincidence annihilation gamma photons as a point needed to determine direction for forward projection and back projection during reconstruction;
3) estimating a positron range kernel for the radioisotope used to generate the PET scan list mode data;
4) estimating TOF uncertainty (TOF-U) kernel using the PET scanner's TOF resolution, wherein size of the TOF-U kernel is determined by TOF resolution of the PET scanner;
5) estimating randoms rate and scatter rate for the prompt gamma photons, resulting in prompt gamma randoms rate and prompt gamma scatter rate;
6) creating a sensitivity image utilizing positron range, normalization, and attenuation;
7) initializing a prompt gamma photon image to a value 1;
8) iterating the following steps a) through i) for a specified number of times or until converged, where the specified number is determined by the PET scanner system and the desired image quality:
   a) applying the positron range kernel to the prompt gamma photon image to obtain an updated image;
   b) applying the TOF uncertainty kernel to the updated image to obtain a further updated image;
   c) forward projecting along the further updated image for each prompt gamma photon event in the list mode data to generate forward projected data;
   d) adding the prompt gamma randoms rate and the prompt gamma scatter rate for corresponding prompt gamma rays in the forward projected data;
   e) back projecting reciprocal of the forward projected data corresponding to all prompt gamma events to obtain a back projected image;
   f) apply the positron range kernel to the back projected image data to obtain an updated back projected image;
   g) apply the TOF-U kernel to the updated back projected image to obtain a further updated back projected image;
   h) divide the further updated back projected image with the sensitivity image to obtain prompt gamma update image and then multiply this prompt gamma update image with current prompt gamma image to obtain an updated prompt gamma photon image; and
   i) outputting the updated prompt gamma-ray image after a calibration for quantification.

Illustrative Embodiment 4: A method of reconstructing and identifying prompt gamma rays by triple-photon detection using positron emission tomography (PET) scan list mode data generated with a PET scanner, the method comprising:

1) identifying the prompt gamma ray using time correlation with coincidence annihilation photons and/or using energy window;
2) using a most-likely annihilation point of time-of-flight (TOF) bin, in the list mode data, of the coincidence annihilation gamma photons as a point needed to determine direction for forward projection and back projection during reconstruction;
3) estimating a positron range kernel for the radioisotope used to generate the PET scan list mode data;
4) estimating TOF uncertainty (TOF-U) kernel using the PET scanner's TOF resolution, wherein size of the TOF-U kernel is determined by TOF resolution of the PET scanner;
5) estimating the randoms rate and scatter rate for prompt gamma photons, resulting in prompt gamma randoms rate and prompt gamma scatter rate;
6) creating a sensitivity image utilizing positron range, normalization, and attenuation;
7) initializing a prompt gamma photon image to a value 1;
8) iterating the following steps a) through i) for a specified number of times or until converged, where the specified number is determined by the PET scanner system and the desired image quality:
   a) applying the positron range kernel to the prompt gamma photon image to obtain an updated image;

b) applying the TOF uncertainty kernel to the updated image to obtain a further updated image;

c) forward projecting along the further updated image for each prompt gamma photon event in the list mode data to generate forward projected data;

d) adding the prompt gamma randoms rate and the prompt gamma scatter rate for corresponding prompt gamma rays in the forward projected data;

e) back projecting reciprocal of the forward projected data corresponding to all prompt gamma events to obtain a back projected image;

f) apply the positron range kernel to the back projected image data to obtain an updated back projected image;

g) apply the TOF-U kernel to the updated back projected image to obtain a further updated back projected image;

h) divide the further updated back projected image with the sensitivity image to obtain prompt gamma update image and then multiply this prompt gamma update image with current prompt gamma image to obtain an updated prompt gamma photon image; and i) outputting the updated prompt gamma photon image after a calibration for quantification.

Illustrative Embodiment 5: An imaging system comprising:

a positron emission tomography (PET) scanner;

a memory having instructions stored thereon;

a processor configured to read the instructions to perform a process of reconstructing a PET scan image from a PET scan list mode data that was acquired by scanning a subject body containing a quantity of radioisotope, wherein the method comprises:

accounting for prompt gamma photons emitted by the radioisotope, in addition to coincidence annihilation gamma photon pairs, to improve sensitivity by correcting for positron range and more accurately determine location of the radioisotope; and reconstructing the PET scan image from the list mode data, wherein the reconstruction accounts for the prompt gamma ray associated events by forward and back projecting the prompt gamma photons, thus improving the PET scan image's resolution by reducing effects of positron range.

Illustrative Embodiment 6: The imaging system of Illustrative Embodiment 5, wherein accounting for the prompt gamma photons comprises:

identifying the two coincidence annihilation gamma photons and associated prompt gamma photon to determine direction of the corresponding prompt gamma ray.

Illustrative Embodiment 7: The imaging system of Illustrative Embodiment 6, wherein identifying the associated prompt gamma photon to determine the direction of the corresponding prompt gamma ray comprises:

1) identifying the prompt gamma photon using time correlation with coincidence annihilation gamma photons and/or using energy window;

2) using a most-likely annihilation point of time-of-flight (TOF) bin, in the list mode data, of the coincidence annihilation gamma photons as a point needed to determine direction for forward projection and back projection during reconstruction;

3) estimating a positron range kernel for the radioisotope used to generate the PET scan list mode data;

4) estimating TOF uncertainty (TOF-U) kernel using the PET scanner's TOF resolution, wherein size of the TOF-U kernel is determined by TOF resolution of the PET scanner;

5) estimating the randoms rate and scatter rate for prompt gamma photons, resulting in prompt gamma randoms rate and prompt gamma scatter rate;

6) creating a sensitivity image utilizing positron range, normalization, and attenuation;

7) initializing a prompt gamma photon image to a value 1;

8) iterating the following steps a) through i) for a specified number of times or until converged, where the specified number is determined by the PET scanner system and the desired image quality:

a) applying the positron range kernel to the prompt gamma photon image to obtain an updated image;

b) applying the TOF uncertainty kernel to the updated image to obtain a further updated image;

c) forward projecting along the further updated image for each prompt gamma photon event in the list mode data to generate forward projected prompt gamma data;

d) adding the prompt gamma randoms rate and the prompt gamma scatter rate for corresponding prompt gamma rays in the forward projected data;

e) back projecting reciprocal of the forward projected data corresponding to all prompt gamma events to obtain a back projected image;

f) apply the positron range kernel to the back projected image data to obtain an updated back projected image;

g) apply the TOF-U kernel to the updated back projected image to obtain a further updated back projected image;

h) divide the further updated back projected image with the sensitivity image to obtain prompt gamma update image and then multiply this prompt gamma update image with current prompt gamma image to obtain an updated prompt gamma photon image; and i) outputting the updated prompt gamma photon image after a calibration for quantification.

It will be understood that the foregoing description is of exemplary embodiments of this invention, and that the invention is not limited to the specific forms shown. Modifications may be made in the design and arrangement of the elements without departing from the scope of the invention.

What is claimed is:

1. A method of reconstructing a positron emission tomography (PET) scan image from a PET scan list mode data that was acquired by scanning a subject body containing a quantity of radioisotope, the method comprising:

accounting for prompt gamma photons emitted by the radioisotope, in addition to coincidence annihilation gamma photon pairs, to improve sensitivity and more accurately determine location of the radioisotope;

identifying a set of gamma photons of at least one of the coincidence annihilation gamma photon pairs and associated prompt gamma events to determine a direction of a corresponding prompt gamma ray;

restructuring the corresponding prompt gamma ray by:

identifying the corresponding prompt gamma ray using time correlation with coincidence annihilation gamma photons and/or using energy windowing;

using a most-likely annihilation point of time-of-flight (TOF) bin, in the list mode data, of the coincidence annihilation gamma photons as a point needed to determine direction for forward projection and back projection during reconstruction;

estimating a positron range kernel for the radioisotope used to generate the PET scan list mode data;

estimating TOF uncertainty (TOF-U) kernel using the PET scanner's TOF resolution, wherein size of the TOF-U kernel is determined by TOF resolution of the PET scanner;

estimating randoms rate and scatter rate for the prompt gamma photons, resulting in prompt gamma randoms rate and prompt gamma scatter rate;

creating a sensitivity image utilizing positron range, normalization, and attenuation;

initializing a prompt gamma photon image to a value 1;

iterating the following steps a) through i) for a specified number of times or until converged, where the specified number is determined by the PET scanner system and the desired image quality:

a) applying the positron range kernel to the prompt gamma photon image to obtain an updated image;

b) applying the TOF uncertainty kernel to the updated image to obtain a further updated image;

c) forward projecting along the further updated image for each prompt gamma photon event in the list mode data to generate forward projected data;

d) adding the prompt gamma randoms rate and the prompt gamma scatter rate for the corresponding prompt gamma ray in the forward projected data;

e) back projecting reciprocal of the forward projected data corresponding to all prompt gamma events to obtain a back projected image;

f) apply the positron range kernel to the back projected image data to obtain an updated back projected image;

g) apply the TOF-U kernel to the updated back projected image to obtain a further updated back projected image;

h) divide the further updated back projected image with the sensitivity image to obtain prompt gamma update image and then multiply this prompt gamma update image with current prompt gamma image to obtain an updated prompt gamma photon image; and i) outputting the updated prompt gamma-ray image after a calibration for quantification; and reconstructing the PET scan image from the list mode data, wherein the reconstruction accounts for the prompt gamma photon associated events by forward and back projecting along the corresponding prompt gamma ray, thus improving the PET scan image's resolution by reducing effects of positron range.

2. An imaging system comprising:

a positron emission tomography (PET) scanner;

a memory having instructions stored thereon;

a processor configured to read the instructions to perform a process of reconstructing a PET scan image from a PET scan list mode data that was acquired by scanning a subject body containing a quantity of radioisotope, wherein the method comprises:

accounting for prompt gamma photons emitted by the radioisotope, in addition to coincidence annihilation gamma photon pairs, to improve sensitivity by correcting for positron range and more accurately determine location of the radioisotope;

identifying a set of gamma photons of at least one of the coincidence annihilation gamma photons and associated prompt gamma events to determine direction of a corresponding prompt gamma ray;

restructuring the corresponding prompt gamma ray by:

identifying the corresponding prompt gamma ray using time correlation with coincidence annihilation gamma photons and/or using energy windowing;

using a most-likely annihilation point of time-of-flight (TOF) bin, in the list mode data, of the coincidence annihilation gamma photons as a point needed to determine direction for forward projection and back projection during reconstruction;

estimating a positron range kernel for the radioisotope used to generate the PET scan list mode data;

estimating TOF uncertainty (TOF-U) kernel using the PET scanner's TOF resolution, wherein size of the TOF-U kernel is determined by TOF resolution of the PET scanner;

estimating randoms rate and scatter rate for the prompt gamma photons, resulting in prompt gamma randoms rate and prompt gamma scatter rate;

creating a sensitivity image utilizing positron range, normalization, and attenuation;

initializing a prompt gamma photon image to a value 1;

iterating the following steps a) through i) for a specified number of times or until converged, where the specified number is determined by the PET scanner system and the desired image quality:

a) applying the positron range kernel to the prompt gamma photon image to obtain an updated image;

b) applying the TOF uncertainty kernel to the updated image to obtain a further updated image;

c) forward projecting along the further updated image for each prompt gamma photon event in the list mode data to generate forward projected data;

d) adding the prompt gamma randoms rate and the prompt gamma scatter rate for the corresponding prompt gamma ray in the forward projected data;

e) back projecting reciprocal of the forward projected data corresponding to all prompt gamma events to obtain a back projected image;

f) apply the positron range kernel to the back projected image data to obtain an updated back projected image;

g) apply the TOF-U kernel to the updated back projected image to obtain a further updated back projected image;

h) divide the further updated back projected image with the sensitivity image to obtain prompt gamma update image and then multiply this prompt gamma update image with current prompt gamma image to obtain an updated prompt gamma photon image; and i) outputting the updated prompt gamma-ray image after a calibration for quantification; and reconstructing the PET scan image from the list mode data, wherein the reconstruction accounts for the corresponding prompt gamma ray associated events by forward and back projecting the prompt gamma photons, thus improving the PET scan image's resolution by reducing effects of positron range.

* * * * *